(No Model.)

W. H. SIPPERLY.
HARNESS SADDLE.

No. 311,856. Patented Feb. 3, 1885.

WITNESSES:
Norris A. Clark.
P. B. Turpin.

INVENTOR.
William H. Sipperly
By R. S. & A. P. Lacey
ATTY'S

UNITED STATES PATENT OFFICE.

WILLIAM H. SIPPERLY, OF FISHKILL, ASSIGNOR OF ONE-HALF TO WILLIAM H. JACKSON, OF MATTEAWAN, NEW YORK.

HARNESS-SADDLE.

SPECIFICATION forming part of Letters Patent No. 311,856, dated February 3, 1885.

Application filed November 24, 1884. (No model.)

*To all whom it may concern:*

Be it known that I, WILLIAM H. SIPPERLY, a citizen of the United States, residing at Fishkill, in the county of Dutchess and State of New York, have invented certain new and useful Improvements in Harness-Saddles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to saddles for cart-harness; and it consists in certain novel constructions, combinations, and arrangements of parts, as will be hereinafter more fully described and claimed.

Figure 1:
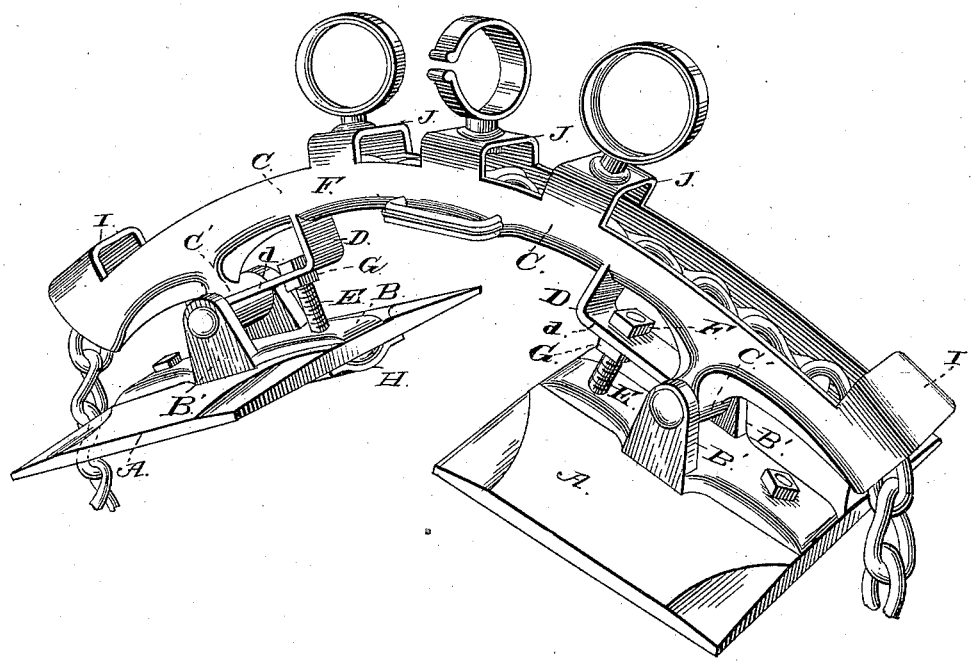
Figure 2:
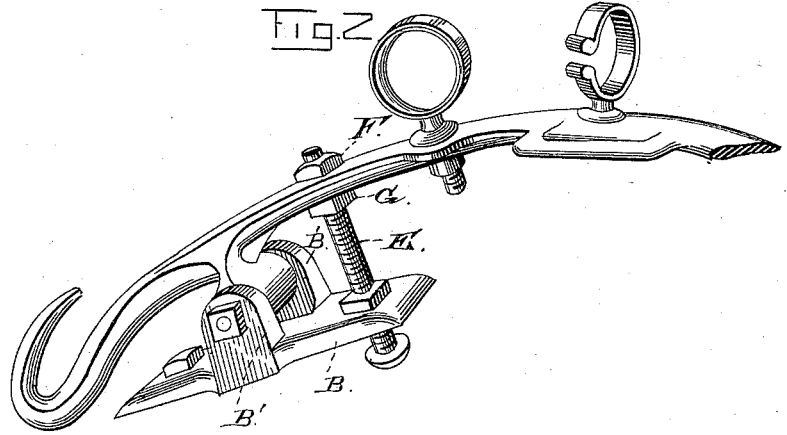

In the drawings, Figure 1 is a perspective view of my improved saddle. Fig. 2 is a perspective view of a portion of a saddle representing a modification.

My invention pertains to that class of saddles in which the pads are pivoted to the tree so as to permit their adjustment to different angles in order to properly fit different-sized animals. In so pivoting the parts I prefer to employ the construction shown, which consists in pad-blocks A, on which are secured, by bolts or otherwise, plates B, provided with upwardly-projected lugs or ears B', between which are pivoted knuckles C', depending from the tree C. It will be evident, however, that the pivot could be effected in various other ways without departing from the principles of this invention. The tree may be formed with a groove extended longitudinally in its upper side to receive the back-chain, as shown. I provide the tree with bearing bars or plates D D, having horizontal portions $d$ extended below the trees above the edges of the pads. Bolts E E are projected upward from the pads and through the portions $d$ of the bearing-bars D. Nuts F G are turned on bolt E, one above and the other below plate D. By setting these nuts on the bolt the pads may be adjusted to and held at any suitable angle desired.

While I prefer to use the form of tree shown in Fig. 1 and the arrangement of bearing-bar D and the nuts F G under the main portion of the tree, it is manifest that good results could be had by simply passing the bolt E through the body of the tree and setting nuts F G above and below the said body, as is shown in Fig. 2. The bolt E may be formed integral with the plate B; but it is preferably made separate, and secured by a keeper, as H, or other suitable device, by which it may be held from rotation. It will be understood that the bolt E might be swiveled at its lower end in the pad and screw-threaded into and through the tree, so that by rotating such bolt the pad may be set to any suitable angle, though it is preferred to use the nuts F G, as thereby the strain is not exerted so directly on the thread, and a stronger construction is provided.

In the preferred construction shown in Fig. 1 the tree is formed with a chain-groove covered at its ends by keepers I I, and near its middle by keepers J J, supporting the driving and check-rein terrets, as shown. These loops or keepers serve to retain the chain in the tree-groove, preventing it from becoming displaced.

Having thus described my invention, what I claim, and desire to secure by Letters Patent, is—

1. The combination, with the tree and the pads pivotally supported thereon, of the bolts secured to the pads and projected through suitable openings in the tree, and nuts turned on the bolts, one above and the other below that portion of the tree through which they are passed, substantially as set forth.

2. The combination of the tree provided with bearing-bars having bolt-openings and arranged below the body of the tree, the pads pivotally supported on the tree, and bolts extended from the pads through the openings in the bearing-bars, substantially as set forth.

3. In a harness-saddle, the combination of the tree provided with bearing-bars having bolt-openings, the pads, the bolts projected from the pads through the openings through the bearing-bars, and nuts turned on the bolts above and below the bearing-bars, substantially as set forth.

4. As an article of manufacture, a cart-saddle tree made of metal having in its upper side a chain-groove open the greater part of its length, and provided near its ends with keepers I, extended above the chain-groove, substantially as set forth.

In testimony whereof I affix my signature in presence of two witnesses.

WILLIAM H. SIPPERLY.

Witnesses:
HENRY B. BEVIER,
SYLVESTER H. MARC.